Aug. 28, 1928.
W. G. BERRY ET AL
1,682,164
COMBINATION LIGHT
Filed April 2, 1926
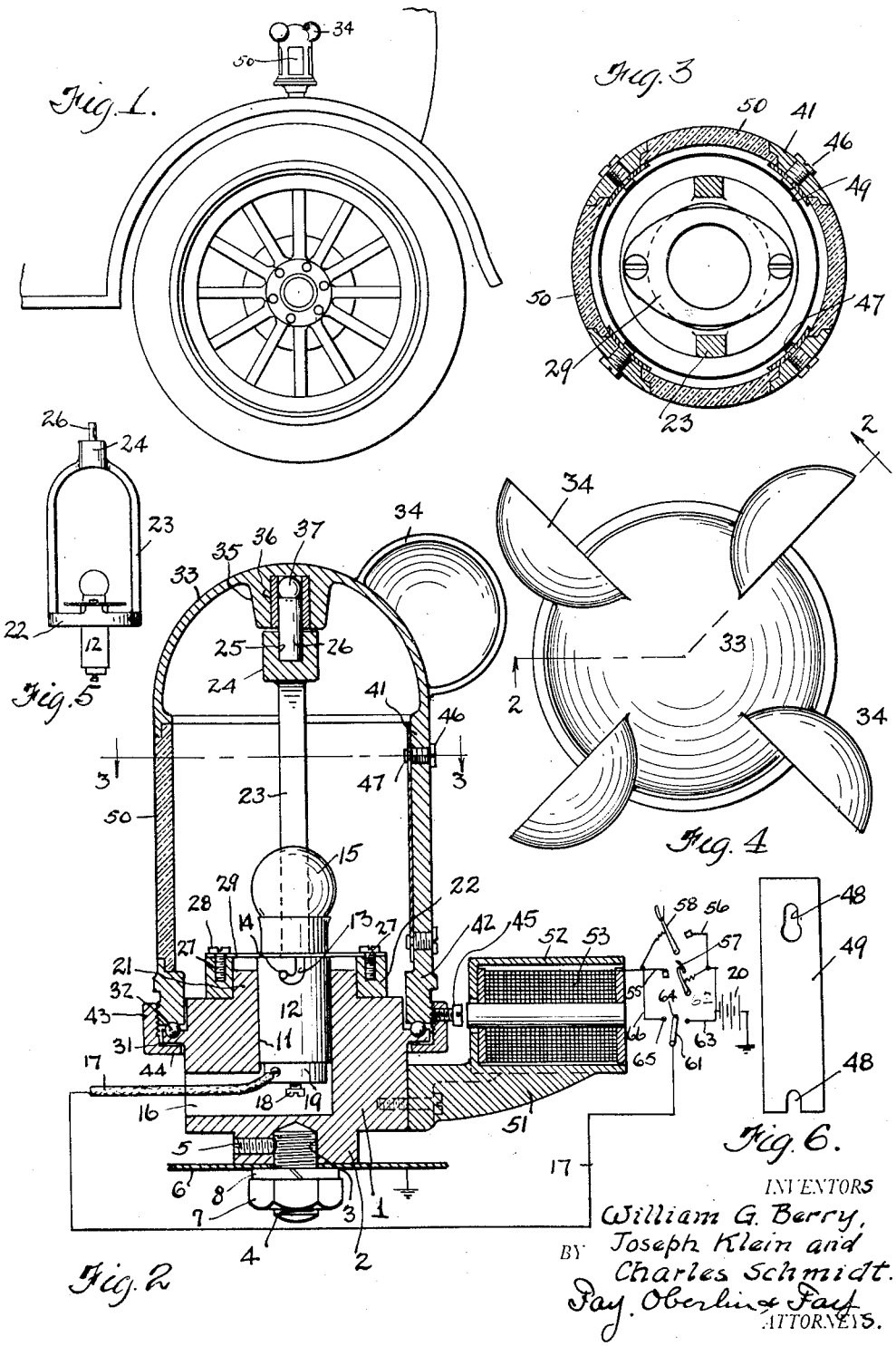
INVENTORS
William G. Berry,
Joseph Klein and
Charles Schmidt.
BY Fay, Oberlin & Fay
ATTORNEYS.

Patented Aug. 28, 1928.

1,682,164

UNITED STATES PATENT OFFICE.

WILLIAM G. BERRY, JOSEPH KLEIN, AND CHARLES SCHMIDT, OF CLEVELAND, OHIO.

COMBINATION LIGHT.

Application filed April 2, 1926. Serial No. 99,269.

This invention as indicated relates to a combination light. More particularly it comprises a device adapted to be attached to a vehicle, and which will present a rotative ornamental effect when the vehicle is in motion, and which may serve as a substantially standard form of parking light when the vehicle is at rest. It also includes a construction whereby the rotative motion of the device may be arrested when it is desired to give a "slow" or "stop" signal when the vehicle has been retarded or stopped in transit.

The device may be supported upon the radiator cap of an automobile or it may be mounted upon the left hand fender in the usual position of the parking light, or positioned elsewhere as may be preferred. When clearly visible from the rear the device may be used as a stop light, an electromagnet of sufficient force being provided to half the revolving casing with a red light showing at the rear at such times as the foot or emergency brake is applied. The device may also be applied to a motor car body being positioned at any point where an ornamental effect would be found desirable such as in place of the usual cowl lights. Its use obviously would not be restricted to the vehicles mentioned but it might also be applied to various other structures such as motor boats, roller coasters, and amusement devices of different kinds.

To the accomplishment of the foregoing and related ends, said invention then consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

In said annexed drawing:

Fig. 1 is a side elevation showing a combination light constructed in accordance with the principles of our invention mounted on the left hand rear fender of an automobile; Fig. 2 is a vertical sectional view taken transversely of the position of the light shown in Fig. 1 and along the line 2—2 shown in Fig. 4 of the drawing looking in the direction of the arrows, and also shows the electrical circuits of the device diagrammatically; Fig. 3 is a horizontal sectional view taken along the line 3—3 shown in Fig. 2 looking in the direction of the arrows; Fig. 4 is a top plan view of the device; Fig. 5 is an elevation showing the pivot supporting frame for the revolving casing and Fig. 6 is an elevation of one of the clamping strips of the casing.

As is more clearly shown in Fig. 2 of the drawing, the combination light comprises a base member 1, having a boss 2 on its under side provided centrally with a screw-threaded aperture 3 within which a screw threaded stud 4 is firmly held by means of a set screw 5. The stud, as is clearly shown, is adapted to project through an aperture in the fender 6 of an automobile and a nut 7 and lock washer 8 engaged thereover serve to firmly hold the base member to the upper side of the fender.

The base member 6 and central aperture 11, extending downwardly through its upper side to a point spaced from the base thereof has engaged therein a sleeve 12 provided with a pair of bayonet slots 13 of a standard form to receive the locking studs 14 of a small incandescent bulb 15. A lateral opening 16 through the base member provides a passageway for the conductor cable 17 which is secured in the usual manner by means of a set screw 18 to an insulated terminal block 19 carrying a spring pressed contact (not shown) of conventional form. The conductor table is in circuit with a source of power shown as a battery 20 and is provided with a switch which will presently be described. The return circuit is through the sleeve 12 which is grounded in the usual manner.

The base member on its upper face is provided with an upwardly projecting flange 21 surrounding said central aperture 11, and the base member 22, of a pivot supporting frame 23 is adapted to have a press fit over said upstanding flange. Said frame 23 is of inverted U-shape and is provided with an enlargement 24 centrally of its top which is formed with a socket 25 into which a pin 26 has a press fit. The base member of the frame is provided on opposite sides with a pair of screw threaded apertures 27 into which set screws 28 are adapted to engage and firmly hold in position a top plate or flange 29 formed integrally with the sleeve 12 heretofore referred to which serves as a lamp-receiving socket.

About the upper central part of the base member, an extension flange 31 is provided, the upper side of which is grooved to form a ball race in which ball bearings 32 are received. A revolvable housing or casing 33 for the light is adapted to be supported on said ball bearings. Said casing comprises a frame preferably of cast aluminum having a series of vanes 34, shown as 4 in number in Fig. 4 of the drawing, which may be cast integrally upon the upper side thereof. Centrally of the underside of the dome-like top of the casing a boss 35 is provided apertured to receive a bearing sleeve 36 and a single ball bearing 37 against which the slightly concaved upper end of the pin 26, heretofore described, is adapted to engage. The casing is formed with four posts or standards 41 which connect the upper portion thereof with the integral base member 42. Said base member is grooved on its under side to form the companion ball race to the ball race in this extension flange 31.

The member 42 is screw threaded about its lower outer circumference to provide for screw threaded engagement by a collar 43 having an inwardly directed flange 44, which prevents the accidental separation of the casing from the base. A set screw 45 preferably of iron or steel serves to lock the collar which is formed of aluminum or brass or similar nonmagnetic material to the lower portion 42 of the nonmagnetic casing as is clearly shown in Fig. 2 of the drawing.

Each of the posts or standards 41 is provided with a pair of screws 46 having grooves about their inner ends to provide projecting heads 47. These heads are adapted to engage through slots 48 in clamping strips 49 which as is shown in Fig. 3 cooperate with the projecting lateral edges of the posts to clamp into position the lenses or colored glass windows 50 shown as four in number, set about the sides of the casing. It will be evident as the screws move outwardly the clamping strips will be drawn toward the standards and will firmly clamp the margins of the lenses.

The lenses or windows are preferably curved and may be of glass of various colors. It is desirable for stop-light and parking use of the device to have the lens facing toward the rear when the casing is at rest of red color to conform to the accepted practice.

Suitably secured at one side of the base member, a supporting bracket 51 is provided which may be formed at its upper end with a cylindrical housing 52 for the coil 53 of an electromagnet. The housing is centrally apertured to permit the end of the core 54 of the magnet to project toward the path of rotation of the set screw 45 of magnetic material, heretofore described, with a limited amount of clearance. Thus when the electro-magnet is energized the magnetic influence thereof will serve to hold the set screw opposite the pole of the magnet until the circuit is broken.

The circuit of the electro-magnet is diagrammatically indicated in Fig. 2 of the drawing having a pair of conductors 55, 56, connecting in parallel with the battery 20, through either the foot brake 57 or the emergency brake lever 58. A parallel connection with the battery is also provided for the lamp circuit through a switch 61 having three positions. When upon a contact 62 said switch connects directly with the battery through the conductor 63 for constant illumination of the device at night. When the switch is in the intermediate position 64 the lamp is cut out, and when upon the contact 65 the lamp is energized through the conductor 66 when either the foot or emergency brake is operated. This last adjustment is intended for use of the device as a stop-light during daylight operation of the vehicle. In such case the motion of the casing will be stopped by the electro-magnet and the lamp will be flashed through the closing of the circuit through either of the brake levers.

The connection of the lamp circuit for parking purposes may be either through the contact 62 or the contact 65 as the emergency brake will then be set and the electro-magnet will be energized, and the lamp may be energized directly from the battery or through the emergency brake.

Other modes of applying the principle of our invention may be employed instead of the one explained, change being made as regards the mechanism herein disclosed, provided the means stated by any of the following claims or the equivalent of such stated means be employed.

We therefore particularly point out and distinctly claim as our invention:

1. An article of the character described adapted to be supported on an automobile, having in combination a base, a pivot supporting frame mounted on said base, a lamp supported centrally on said base, an ornamental casing rotatably supported on said base and said frame, and means for rotating said casing adapted to be actuated by the motion of said automobile.

2. An article of the character described adapted to be supported on an automobile, having in combination a base, a pivot supporting frame mounted on said base, a lamp supported centrally on said base, an ornamental casing rotatably supported on said base and said frame, and wind vanes for rotating said casing when said automobile is in motion.

3. An article of the character described having in combination a base, a lamp supported on said base, an ornamental casing rotatably supported on said base, means for rotating said casing, and means rigidly mounted adjacent said casing for stopping the rotation of said casing at a predetermined point.

4. An article of the character described having in combination a base, a lamp supported on said base, an ornamental casing rotatably supported on said base, means for rotating said casing, and electro-magnetic means for stopping the rotation of said casing at a predetermined point.

5. A combination light for an automobile comprising a base, a lamp supported on said base, a casing rotatably supported on said base, wind vanes for rotating said casing when automobile is in motion, and electro-magnetic means associated with the brake mechanism of said automobile for stopping the rotation of said casing at a predetermined point.

6. A combination light for an automobile comprising a base, a lamp supported on said base, a casing rotatably supported on said base, wind vanes for rotating said casing when automobile is in motion, a plurality of colored lenses in said casing, and electro-magnetic means associated with the brake mechanism of said automobile for stopping the rotation of said casing at a predetermined point with a red lens exposed rearwardly of said automobile to serve as a warning signal.

7. A combination light for an automobile comprising a base, a lamp supported on said base, a casing rotatably supported on said base, wind vanes for rotating said casing when said automobile is in motion, an electro-magnet adjacent said casing, a magnetic stop for said magnet mounted on said rotatable casing, and means for energizing said electro-magnet when the motion of said automobile is being retarded.

8. A combination light for an automobile comprising a base, a lamp supported on said base, a casing rotatably supported on said base, wind vanes for rotating said casing when said automobile is in motion, an electro-magnet adjacent said casing, a magnetic stop for said magnet mounted on said rotatable casing, circuit connections between a source of power and said electro-magnet and a switch in said circuit associated with the brake mechanism of said automobile for closing said circuit when the motion of the automobile is being retarded through braking action.

9. A combination light for an automobile comprising a base, a lamp supported on said base, a casing rotatably supported on said base, wind vanes for rotating said casing when said automobile is in motion, an electro-magnet adjacent said casing, a magnetic stop for said magnet mounted on said rotatable casing, circuit connections between a source of power and said electro-magnet, and a switch connected with the operating mechanism of said automobile and adapted to close the circuit through said electro-magnet when operated.

10. A combination light for an automobile comprising a base, a lamp supported on said base, a casing rotatably supported on said base, wind vanes for rotating said casing when said automobile is in motion, an electro-magnet adjacent said casing, a magnetic stop for said magnet mounted on said rotatable casing, circuit connections in parallel between a source of power and said electro-magnet and lamp respectively, a pair of switches associated respectively with the brake and foot pedals of said automobile connected in parallel in each of said circuit connections for energizing said electro-magnet and lamp when the motion of said automobile is retarded.

11. A combination light for an automobile comprising a base, a lamp supported on said base, a casing rotatably supported on said base, wind vanes for rotating said casing when said automobile is in motion, an electro-magnet adjacent said casing, a magnetic stop for said magnet mounted on said rotatable casing, circuit connections in parallel between a source of power and said electro-magnet and lamp respectively, a pair of switches associated respectively with the brake and foot pedals of said automobile connected in parallel in each of said circuit connections for energizing said electro-magnet and lamp when the motion of said automobile is retarded, a shunt connection between said lamp and said source of power and a switch for selectively connecting said lamp through said shunt connection with said source of power, and through said parallel switches with said source of power.

12. A combination light for an automobile comprising a base, a lamp supported on said base, a dome-like casing for said lamp, a plurality of wind vanes mounted on the top of said casing, a plurality of lateral openings about said casing having the margins thereof flanged to serve as clamping means, said casing having a plurality of lenses flanged to cooperate with the flanges about said opening, a plurality of set screws mounted in said casing intermediately of said openings and having projecting heads, clamping plates provided with apertures adapted to cooperate with said projecting heads whereby the same may be drawn into clamping relation with the respective projecting flanges of said casing and lenses.

Signed by us this 27th day of March, 1926.

WILLIAM G. BERRY.
JOSEPH KLEIN.
CHARLES SCHMIDT.